A. NEWTON-SMITH.
PICKING MECHANISM FOR LOOMS.
APPLICATION FILED JAN. 3, 1918.
1,322,933. Patented Nov. 25, 1919.
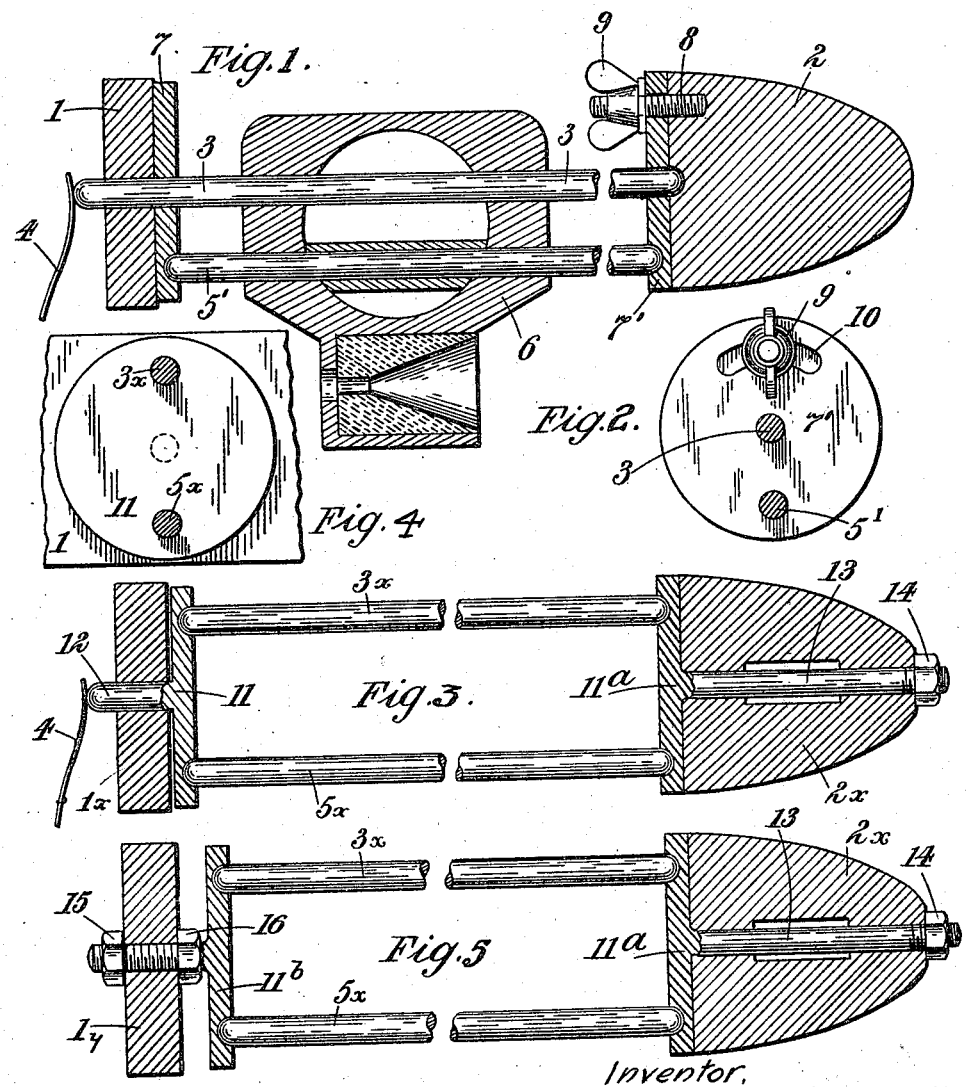

UNITED STATES PATENT OFFICE.

ARTHUR NEWTON-SMITH, OF WESTMINSTER, ENGLAND.

PICKING MECHANISM FOR LOOMS.

1,322,933.  Specification of Letters Patent.  Patented Nov. 25, 1919.

Application filed January 3, 1918. Serial No. 210,156.

*To all whom it may concern:*

Be it known that I, ARTHUR NEWTON-SMITH, a subject of the King of Great Britain and Ireland, and resident of Westminster, England, have invented new and useful Improvements in Picking Mechanism for Looms, of which the following is a specification.

This invention relates to improvements in the picking mechanism of looms, and is applicable to overtype picking mechanism, and also to undertype picking mechanism of the class or type in which the picker is connected with the picking stick by a picking strap and is thus indirectly acted upon by the picking stick.

The invention has for object to overcome or minimize certain disadvantages which pertain to pickers as ordinarily mounted on the picking spindle.

The invention consists in the provision of what is herein called a duplex picking spindle and in mounting the picker thereon.

In picking mechanism for looms in accordance with this invention, the picking spindle comprises a pair of rods mounted parallel with one another and carried by the spindle stud and the end plate of the shuttle box, the picker being mounted and movable along both of said rods.

As will be obvious, the invention can be carried into effect in various ways, and in the accompanying drawings, which are to some extent diagrammatic and are illustrative only, several arrangements are shown.

Figure 1 is a sectional elevational view of one form of the device, and Fig. 2 is an end view of the spindle stud;

Fig. 3 is also a sectional elevational view of a modification, and Fig. 4 is an end view of the end plate of the shuttle box; and Fig. 5 is a sectional elevational view of another modification.

Referring to Fig. 1.

1 is the end plate of the shuttle box and 2 is the spindle stud. 3 is a rod, which, in the ordinary arrangement, would form the picking spindle. The rod 3 is mounted in the same manner as is a picking spindle, that is to say, one end is contained and carried by the spindle hole in the spindle stud 2, the other end passing through a hole in the end plate 1 of the shuttle box and being acted upon by the spindle spring 4. 5′ is another rod, and parallel with the rod 3; the rods 3, 5′ constitute what has herein been called a duplex picking spindle.

In the arrangement illustrated, the rod 5′ is shown as mounted below the rod 3. The disposition of the rods 3, 5′ will depend upon the construction of the picker employed and upon other considerations based upon the construction and dimensions of the loom. The picker employed may be of any suitable construction, but preferably one of the kind in which the picking effort is applied thereto coaxially with one of the rods 3, 5′ or as near as possible to the shuttle, is employed. Pickers in which the picking effort is so applied are described and claimed in the specification of another application for Letters Patent No. 6045, dated 28th April, 1917, and such pickers when mounted on a duplex picking spindle in accordance with this invention have the picking strap attached to, or connected with, a part of the picker that embraces or surrounds one of the rods as shown in Fig. 1.

In the arrangement illustrated in Figs. 1 and 2, the rod 5′ is mounted at its ends in disks 7′, which in turn are mounted on the rod 3, which is mounted as ordinarily. The disks 7 and 7′ are rotatable about the rod 3 and can be secured in any desired position so as to prevent angular movement of the rod 5 about its center of suspension by locking means comprising, for example and as shown, a stud 8, with fly nut 9, mounted on the spindle stud 2 and passing through a slot 10 in the disk 7′ adjacent the spindle stud.

In the modification illustrated in Figs. 3 and 4, the ends of the rods $3^x$, $5^x$ are both mounted in what may be called disks 11, $11^a$ and these disks 11, $11^a$ are carried by bolts 12, 13 respectively, formed in one therewith, bolts 13 being threaded at their free ends and mounted, respectively, in the end plate $1^x$ of the shuttle box and in the spindle stud $2^x$. In this modification, the ordinary spindle hole in the spindle stud $2^x$ is bored through and receives the bolt 13 which is maintained in position by a nut 14. The bolt 12 is under the action of the spindle spring 4 outside the end plate $1^x$ in much the same manner as is the ordinary picking spindle, so that the rods $3^x$, $5^x$ are forced toward the spindle stud and kept in the desired position. Instead of employing a spindle spring 4 to act on the end of the bolt 12, the mounting of the bolt 12 may be modified as shown in Fig. 5 in which it is provided with two nuts 15, 16 placed one on each side of the end plate 1ʸ. These nuts permit the disk 11ᵇ to be adjusted relatively to the disk 11ᵃ and when screwed up hold said disk 11ᵇ immovable.

The constructions shown in the drawing are such that they permit a picker 6 to be employed with shuttles of various sizes, that is to say, they permit of the picker and "duplex" picking spindle being moved angularly, and as such movement produces a vertical and horizontal adjustment of the part of the picker which receives the shuttle impact, that part is accommodated to various heights and widths of shuttle.

With pickers mounted on "duplex" picking spindles, the tongue or picker foot ordinarily employed to prevent angular displacement is or may be dispensed with, as may be the groove or slot in the fly plate.

What I claim is:—

1. In a picking mechanism for looms, the combination with an end plate of a shuttle box, of a spindle stud, a picker disposed between said end plate and said stud and means for adjusting the angular position of the picker.

2. In a picking mechanism for looms, the combination with an end plate of a shuttle box, of a spindle stud, a picker disposed between said end plate and said stud, said picker being rotatable to different angular positions to accommodate shuttles of different sizes and means for holding the picker in its adjusted position.

3. In a picking mechanism for looms, the combination with an end plate of a shuttle box, of a spindle stud, a pair of parallel rods, a picker suported by said parallel rods and means for shifting the relative positions of said rods while maintaining the latter parallel, to vary the angular position of the picker.

4. In a picking mechanism for looms, the combination with an end plate of a shuttle box, of a spindle stud, a pair of parallel rods, a picker supported by said parallel rods, means for shifting the relative positions of said rods while maintaining the latter parallel, to vary the angular position of the picker and means for securing the picker in its adjusted positions.

5. In a picking mechanism for looms, the combination with an end plate of a shuttle box, of a spindle stud, a pair of parallel rods for supporting a picker, a disk pivotally mounted on said end plate, each of said parallel rods having one end secured to said disk, the opposite ends of the rods being secured to said spindle stud.

6. In a picking mechanism for looms, the combination with an end plate of a shuttle box, of a spindle stud, a pair of parallel rods for supporting a picker, a disk having a central pivot-bolt extending through said end plate, said pair of parallel rods being disposed on opposite sides of the axis of said pivot-bolt, each of said parallel rods having one end secured to said disk and the other end secured to the spindle stud.

7. In a picking mechanism for looms, the combination with an end plate of a shuttle box, of a spindle stud, a pair of parallel rods for supporting a picker, a disk having a central pivot-bolt extending through said end plate, said pair of parallel rods being disposed on opposite sides of the axis of said pivot-bolt and at equal distances therefrom, each of said parallel rods having one end secured to said disk and the other end secured to the spindle stud.

8. In a picking mechanism for looms, the combination with an end plate of a shuttle box, of a spindle stud, a pair of parallel rods for supporting a picker, a disk having a central pivot-bolt extending through said end plate, said pair of parallel rods being disposed on opposite sides of the axis of said pivot-bolt and at equal distances therefrom, each of said parallel rods having one end secured to said disk, and the other end secured to the spindle stud and means for securing the pivot-bolt in different angular positions.

9. In a picking mechanism for looms, the combination with an end plate of a shuttle box, of a spindle stud, a pair of parallel rods for supporting a picker, a disk having a central pivot-bolt extending through said end plate, said pair of parallel rods being disposed on opposite sides of the axis of said pivot-bolt and at equal distances therefrom, each of said parallel rods having one end secured to said disk, and the other end secured to the spindle stud and means for securing the pivot-bolt in different angular positions, said means comprising a nut secured to a threaded end of said pivot-bolt and arranged to engage said end plate.

10. In a picking mechanism for looms, the combination with an end plate of a shuttle box of a pair of parallel rods for supporting a picker, and means for shifting the plane of the parallel rods to different angular positions.

Dated this 11th day of December, 1917.

ARTHUR NEWTON-SMITH.